(12) United States Patent
Mercuri

(10) Patent No.: US 9,979,631 B2
(45) Date of Patent: *May 22, 2018

(54) DYNAMIC REROUTING OF SERVICE REQUESTS BETWEEN SERVICE ENDPOINTS FOR WEB SERVICES IN A COMPOSITE SERVICE

(71) Applicant: Microsoft Technology Licensing, LLC, Redmond, WA (US)

(72) Inventor: Marc Mercuri, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/619,718

(22) Filed: Feb. 11, 2015

(65) Prior Publication Data

US 2015/0222525 A1 Aug. 6, 2015

Related U.S. Application Data

(63) Continuation of application No. 12/906,144, filed on Oct. 18, 2010, now Pat. No. 8,959,219.

(51) Int. Cl.
*G06F 15/16* (2006.01)
*H04L 12/707* (2013.01)
(Continued)

(52) U.S. Cl.
CPC ............ *H04L 45/22* (2013.01); *G06F 9/5027* (2013.01); *H04L 41/5019* (2013.01);
(Continued)

(58) Field of Classification Search
CPC ............ H04L 67/1002; H04L 67/1008; H04L 67/1012; H04L 67/101
(Continued)

(56) References Cited

U.S. PATENT DOCUMENTS 6,285,349 B1 9/2001 Smith
6,618,076 B1 9/2003 Sukthankar et al.
(Continued)

FOREIGN PATENT DOCUMENTS

KR 20110056167 5/2011

OTHER PUBLICATIONS

Office action for U.S. Appl. No. 14/458,965 dated Aug. 21, 2015, Mercuri, "Providing a monitoring service in a cloud-based computing environment", 5 pages.
(Continued)

*Primary Examiner* — Hieu Hoang
(74) *Attorney, Agent, or Firm* — Workman Nydegger

(57) ABSTRACT

Technologies are described herein for rerouting a service request between service endpoints. The service request is received, at a first web service, from a second web service. The first web service and the second web service may be components of a composite service. The service request is routed to an initial service endpoint configured to respond to the service request according to a service level agreement between the first web service and the second web service. Service criteria associated with the initial service endpoint are monitored. A determination is made as to whether the service criteria meet a performance threshold specified by the service level agreement. If the service criteria do not meet the performance threshold specified by the service level agreement, then the service request is rerouted from the initial service endpoint to an alternate service endpoint.

31 Claims, 3 Drawing Sheets

(51) Int. Cl.
*H04L 29/08* (2006.01)
*G06F 9/50* (2006.01)
*H04L 12/24* (2006.01)
*H04L 12/26* (2006.01)
*H04L 12/851* (2013.01)

(52) U.S. Cl.
CPC ...... *H04L 43/0876* (2013.01); *H04L 47/2425* (2013.01); *H04L 67/101* (2013.01); *H04L 67/1002* (2013.01); *H04L 67/1008* (2013.01); *H04L 67/1012* (2013.01); *G06F 2209/501* (2013.01)

(58) Field of Classification Search
USPC .................................................. 709/224–226
See application file for complete search history.

(56) References Cited

U.S. PATENT DOCUMENTS

| | | | |
|---|---|---|---|
| 6,816,907 B1 | 11/2004 | Mei et al. | |
| 6,842,737 B1 | 1/2005 | Stiles et al. | |
| 6,950,848 B1 | 9/2005 | Yousefi'zadeh | |
| 7,062,559 B2 | 6/2006 | Yoshimura et al. | |
| 7,162,436 B1 | 1/2007 | Eckel, Jr. | |
| 7,194,522 B1 | 3/2007 | Swildens et al. | |
| 7,269,157 B2 | 9/2007 | Klinker et al. | |
| 7,310,684 B2 | 12/2007 | Patrick et al. | |
| 7,518,623 B2 | 4/2009 | Dowling et al. | |
| 7,552,170 B2 | 6/2009 | Owen et al. | |
| 7,743,001 B1 | 6/2010 | Vermeulen et al. | |
| 7,765,293 B2 | 7/2010 | Adams et al. | |
| 7,783,499 B2 | 8/2010 | Boughannam | |
| 7,801,783 B2 | 9/2010 | Kende et al. | |
| 7,901,095 B2 | 3/2011 | Xiao et al. | |
| 7,986,707 B2 | 7/2011 | Dettori et al. | |
| 8,204,717 B2 | 6/2012 | McLaughlin et al. | |
| 8,234,375 B2 | 7/2012 | Ghadialy et al. | |
| 8,352,473 B2 | 1/2013 | Fuxman et al. | |
| 8,380,845 B2 | 2/2013 | Mercuri | |
| 8,417,409 B2 | 4/2013 | Bast et al. | |
| 8,564,879 B1 | 10/2013 | Eaton et al. | |
| 8,621,011 B2 | 12/2013 | Bland et al. | |
| 8,843,623 B2 | 9/2014 | Sela | |
| 8,843,632 B2 | 9/2014 | Mercuri | |
| 8,874,787 B2 | 10/2014 | Mercuri | |
| 8,959,219 B2 | 2/2015 | Mercuri | |
| 9,020,831 B2 | 4/2015 | Simske et al. | |
| 9,215,154 B2 | 12/2015 | Mercuri | |
| 9,660,884 B2 | 5/2017 | Mercuri | |
| 2002/0194324 A1 | 12/2002 | Guha | |
| 2003/0045999 A1 | 3/2003 | Joerg et al. | |
| 2003/0061365 A1 | 3/2003 | White et al. | |
| 2003/0115149 A1 | 6/2003 | Dan et al. | |
| 2003/0131073 A1 | 7/2003 | Lucovsky et al. | |
| 2003/0149735 A1 | 8/2003 | Stark et al. | |
| 2004/0064529 A1 | 4/2004 | Meredith et al. | |
| 2004/0213449 A1 | 10/2004 | Safaee-Rad et al. | |
| 2005/0034001 A1 | 2/2005 | Pontarelli | |
| 2005/0038867 A1 | 2/2005 | Henderson et al. | |
| 2005/0068466 A1 | 3/2005 | Waters et al. | |
| 2005/0086330 A1 | 4/2005 | Perham et al. | |
| 2005/0091374 A1 | 4/2005 | Ganesan et al. | |
| 2005/0165656 A1* | 7/2005 | Frederick | G06Q 20/102 705/26.1 |
| 2005/0172027 A1 | 8/2005 | Castellanos et al. | |
| 2005/0241823 A1 | 11/2005 | Beato et al. | |
| 2006/0080120 A1 | 4/2006 | Tcherevik | |
| 2006/0161554 A1 | 7/2006 | Lucovsky et al. | |
| 2006/0224748 A1 | 10/2006 | Gupta et al. | |
| 2006/0265720 A1* | 11/2006 | Cai | H04L 67/16 719/330 |
| 2007/0005777 A1 | 1/2007 | Fremantle et al. | |
| 2007/0156813 A1 | 7/2007 | Galvez et al. | |
| 2007/0156919 A1 | 7/2007 | Potti et al. | |
| 2007/0256083 A1 | 11/2007 | Vayssiere | |
| 2007/0291121 A1 | 12/2007 | Chuang et al. | |
| 2008/0027772 A1 | 1/2008 | Gernega et al. | |
| 2008/0062194 A1 | 3/2008 | Bassi et al. | |
| 2008/0080393 A1 | 4/2008 | Meijer et al. | |
| 2008/0080396 A1 | 4/2008 | Meijer et al. | |
| 2008/0080552 A1 | 4/2008 | Gates et al. | |
| 2008/0082693 A1 | 4/2008 | Meijer et al. | |
| 2008/0104393 A1 | 5/2008 | Glasser et al. | |
| 2008/0134043 A1 | 6/2008 | Georgis et al. | |
| 2008/0147453 A1 | 6/2008 | Kogan et al. | |
| 2008/0189243 A1 | 8/2008 | Li et al. | |
| 2008/0235384 A1 | 9/2008 | Meek et al. | |
| 2008/0301219 A1 | 12/2008 | Thornburgh et al. | |
| 2008/0320497 A1 | 12/2008 | Tarkoma et al. | |
| 2009/0006614 A1 | 1/2009 | Le et al. | |
| 2009/0037896 A1 | 2/2009 | Grechanik et al. | |
| 2009/0048994 A1 | 2/2009 | Applebaum et al. | |
| 2009/0089078 A1 | 4/2009 | Bursey | |
| 2009/0150565 A1 | 6/2009 | Grossner et al. | |
| 2009/0157419 A1 | 6/2009 | Bursey | |
| 2009/0182955 A1 | 7/2009 | Cherukuri | |
| 2009/0196308 A1 | 8/2009 | Pan et al. | |
| 2009/0210528 A1 | 8/2009 | Swildens et al. | |
| 2009/0248693 A1 | 10/2009 | Sagar et al. | |
| 2010/0030866 A1 | 2/2010 | Bedi | |
| 2010/0076856 A1 | 3/2010 | Mullins | |
| 2010/0088150 A1 | 4/2010 | Mazhar et al. | |
| 2010/0131324 A1 | 5/2010 | Ferris | |
| 2010/0131649 A1 | 5/2010 | Ferris | |
| 2010/0153482 A1 | 6/2010 | Kim et al. | |
| 2010/0211782 A1 | 8/2010 | Auradkar et al. | |
| 2010/0231603 A1 | 9/2010 | Kang | |
| 2010/0299763 A1 | 11/2010 | Marcus et al. | |
| 2011/0022812 A1 | 1/2011 | van der Linden et al. | |
| 2011/0032248 A1 | 2/2011 | Atkins | |
| 2011/0047230 A1 | 2/2011 | McGee | |
| 2011/0093435 A1 | 4/2011 | Zha et al. | |
| 2011/0093436 A1 | 4/2011 | Zha et al. | |
| 2011/0109228 A1 | 5/2011 | Shimomura et al. | |
| 2011/0227964 A1 | 9/2011 | Chanji et al. | |
| 2011/0231899 A1 | 9/2011 | Pulier et al. | |
| 2011/0238458 A1 | 9/2011 | Purcell et al. | |
| 2011/0238459 A1 | 9/2011 | Bottom | |
| 2011/0267365 A1 | 11/2011 | Kostal et al. | |
| 2011/0276490 A1 | 11/2011 | Wang et al. | |
| 2011/0296022 A1 | 12/2011 | Ferris et al. | |
| 2012/0023501 A1 | 1/2012 | Chi et al. | |
| 2012/0066487 A1 | 3/2012 | Brown et al. | |
| 2012/0079490 A1 | 3/2012 | Bond et al. | |
| 2012/0124193 A1 | 5/2012 | Ebrahim et al. | |
| 2012/0300044 A1 | 11/2012 | Thomas et al. | |
| 2013/0016082 A1 | 1/2013 | Coley et al. | |
| 2013/0041866 A1 | 2/2013 | Simske et al. | |
| 2013/0147764 A1 | 6/2013 | Chaji et al. | |
| 2015/0081914 A1 | 3/2015 | Mercuri | |
| 2015/0113167 A1 | 4/2015 | Mercuri | |
| 2017/0207991 A1 | 7/2017 | Mercuri | |

OTHER PUBLICATIONS

Office Action for U.S. Appl. No. 14/491,059, dated Oct. 8, 2015, Marc Mercuri, "Allocation of Resources Between Web Services in a Composite Service", 17 pages.

"Amazon Elastic Compute Cloud (Amazon EC2)", Retrieved Jul. 25, 2010 from <<http://aws.amazon.com/ec2/>>, 13 Paqes.

"Best Ever Cloud-based Monitoring Service Unveiled", May 31, 2010, Retrieved from <<http://news.znetindia.com/best-ever-cloud-based-monitoring-service-unveiled.html>>, 4 pgs.

Braynard, et al., "Opus: An Overlay Peer Utility Service", Retrieved at <<http://citeseerx.ist.psu.edu/viewdoc/download?doi=10.1.1.19.728&rep=rep1&type=pdf>>, IEEE Proceedings Open Architectures and Network Programming, 2002, pp. 12.

Buyya, et al., "Market-Oriented Cloud Computing: Vision, Hype, and Reality for Delivering IT Services as Computing Utilities", Retrieved <<http://arxiv.org/ftp/arxiv/papers/0808/0808.3558.pdf>>, Proceedings of the 10th IEEE International Converence on

(56) References Cited

OTHER PUBLICATIONS

High Performance Computing and Communications, HPPC, Sep. 25-27, 2008, pp. 9.
Buyya, et al., "Service and Utility Oriented Distributed Computing Systems: Challenges and Opportunities for Modeling and Simulation Communities", Retrieved at<< http://ieeexplore.ieee.org/stamp/stamp.jsp?arnumber=04494407>>, Proceedings of the 41th Annual Simulation Symposium, ANSS-41, Apr. 14-16, 2008, pp. 68-81.
Chandra, et al., "Dynamic Resource Allocation for Shared Data Centers Using Online Mesurements", Retrieved at <<http://www.cs.uwaterloo.ca/~brecht/servers/readings-new/chandra-iwqos-2003.pdf>>, Technical Report, TR02-30, Department of Computer Science, 2002, pp. 1-22.
Chatterjee, "Messaging Patterns in Service-Oriented Architecture," Apr. 2004, Retrieved from <<http://msdn.microsoft.com/en-us/library/aa480027.aspx#aj2mpsoarch_topic6>>, Microsoft Architect Journal, 17 pgs.
Clayman, et al., "Monitoring Service Clouds in the Future Internet", 2010, Towards the Future Internet. G. Tselentis et al. (Eds.) IOS Press, p. 115-126.
"Cloud Services: Deploy websites, servers and storage on-demand. Only pay for what you need", Retrieved Jul. 25, 2010 from http://tier3.com/cloud-services, 1 pq.
Fankhauser, et al., "Service Level Agreement Trading for the Differentiated Services Architecture", Retrieved at <<http://citeseerx.ist.psu.edu/viewdoc/download?doi=10.1.1.37.5583&rep=rep1&type=pdf>>, Swiss Federal Institute of Technology, Computer Engineering and Networks Lab, Technical Report, No. 59, Nov. 1999, pp. 1-17.
Franceschini, et al., "Cloud Computing: An Agile Approach to IT", Retrieved Aug. 3, 2010 from <<http://www.hds.com/assets/pdf/cloud-computing-an-agile-approach-to-it.pdf>>, 20 pgs.
Hassidim, "Cloud Tools Command Line Framework", Retrieved Aug. 20, 2010 from <<http://www.gigaspaces.com/wiki/display/CCF/Cloud+Tools+Command+Line+Framework>>, 7 pqs.
Leung, "Cloud Monitoring Services: A Resource Guide," Feb. 4, 2010, Retrieved at <<http://www.datacenterknowledge.com/archives/2010/02/04/cloud-monitoring-services-aresource-quide/>>, 12 oas.
Loh, "Automating Cloud Services", Nov. 12, 2009, Retrieved from <<http://www.tapinsystems.com/downloads/Automatina_Cloud_Services.pdf>>, 14 pgs.
Marko, "Cloud Applications: What's Ready?—Cloud Computing Tiers", Feb. 26, 2010, Processor, vol. 32 No. 5, 4 pqs.
"Microsoft Windows Azure Cloud Computing Service", Retrieved Aug. 20, 2010 from <<http://www.itstrategists.com/Microsoft-Azure.aspx>>, 1 page.
Mitra, "Architecture in practice, Part 5: SOA Scenario 2: Service connectivity options," Dec. 18, 2007, Retrieved from <<http://www.ibm.com/developerworks/webservices/library/ar-arprac5/index.html>>, 13 pgs.
Office Action for U.S. Appl. No. 12/906,144, dated Oct. 14, 2014.
Office Action for U.S. Appl. No. 12/900,481, dated Oct. 15, 2012.
Office Action for U.S. Appl. No. 12/907,996, dated Nov. 14, 2012.
Office Action for U.S. Appl. No. 12/901,591, dated Nov. 21, 2012.
Office Action for U.S. Appl. No. 13/764,887, dated Nov. 7, 2013.
Office Action for U.S. Appl. No. 12/906,144, dated Dec. 4, 2013.
Office Action for U.S. Appl. No. 12/907,996, dated Apr. 2, 2013.
Office Action for U.S. Appl. No. 12/907,998, dated May 1, 2013.
Office Action for U.S. Appl. No. 13/764,887, dated May 2, 2014.
Office Action for U.S. Appl. No. 12/901,591, dated May 21, 2014.
Office Action for U.S. Appl. No. 12/901,591, dated May 6, 2013.
Office Action for U.S. Appl. No. 12/907,998, dated Jun. 26, 2014.
Office Action for U.S. Appl. No. 12/906,144, dated Jul. 23, 2013.
Parameswaran et al., "Cloud Interoperability and Standardization", 2009, SETLabs Briefings, vol. 7, No. 7, pp. 19-27.
Partho, "Top10 Cloud Computing Service Providers in 2010: #8.Go Grid", May 21, 2010, Retrieved from <<http://blog.taragana.com/index.php/archive/top-10-cloud-computingservice-providers-in-2010/>>, 8 pgs.
"SOA Software: Frequently Asked Questions," Retrieved Jul. 26, 2010 from <<http://www.soa.com/solutions/faqs/>>, 7 Pages.
Taft, "CSC to Resell Microsoft Cloud Services", Jul. 5, 2009, Retrieved from << http://www.devsource.com/c/a/Architecture/CSC-to-Resell-Microsoft-Cloud-Services/>>, 2 pqs.
"WebMethods X," Dec. 2007, Retrieved from <<http://www.softwareag.com/fr/images/SAG_XBroker_FS_Dec07-web_tcm46-33852.pdf>>, 2 pqs.
"Windows Azure platform", Retrieved Jul. 25, 2010 from <<http://www.microsoft.com/windowsazure/>>, 2 pgs.
Beal, Sheila "Use Google Transit to Help You Navigate Oahu's Bus System," Published on: Mar. 11, 2009, Available at: http://www.govisithahawaii.com/2007/09/13/use-google-maps-to-help-you navigate-oahus-bus-system/, 3 pages.
Chitu, Alex "Public Transit Directions in Google Maps," blog, Published on: Oct. 7, 2007, Available at: http://googlesystem.blogspot.in/2007/10/public-transit-directions-in-google.html, 3 pages.
Garg, Avichal, "Public Transit via Google," Published on: Dec. 7, 2005, Available at: http://googleblog.blogspot.com/2005/12/public-transit-via-google.html, 4 pages.
Guiding Tech homepage, Published on: Apr. 23, 2015, Available at: http://www.guidingtech.com, 8 pages.
Office action for U.S. Appl. No. 14/491,059, dated Mar. 16, 2015, Mercuri, "Allocation of Resources Between Web Services in a Composite Service", 6 pages.
Office action for U.S. Appl. No. 14/458,965 dated Feb. 4, 2016, Mercuri, "Providing a monitoring service in a cloud-based computing environment", 5 pages.
Office action for U.S. Appl. No. 14/491,059, dated Mar. 25, 2016, Mercuri, "Allocation of Resources Between Web Services in a Composite Service", 14 pages.
Office Action for U.S. Appl. No. 14/524,456, dated Jan. 27, 2017, Mercuri et al., "Optimized Consumption of Third-Party Web Services in a Composite Service", 11 pages.
Notice of Allowance dated Aug. 11, 2015 cited in U.S. Appl. No. 13/764,887.
Notice of Allowance dated Sep. 11, 2015 cited in U.S. Appl. No. 13/764,887.
Notice of Allowance dated Sep. 15, 2016 cited in U.S. Appl. No. 14/458,965.
Notice of Allowance dated Dec. 27, 2016 cited in U.S. Appl. No. 14/458,965.
Office Action dated Aug. 7, 2017 cited in U.S. Appl. No. 14/524,456.
Newman, et al., "MonALISA : A Distributed Monitoring Service Architecture", In Proceedings of Conference on Computing in High Energy and Nuclear Physics, Mar. 24, 2003, pp. 1-8.
Notice of Allowance dated Nov. 3, 2017 cited in U.S. Appl. No. 15/476,225.
Notice of Allowance dated Mar. 27, 2018 cited in U.S. Appl. No. 15/476,225.

\* cited by examiner

DYNAMIC REROUTING OF SERVICE REQUESTS BETWEEN SERVICE ENDPOINTS FOR WEB SERVICES IN A COMPOSITE SERVICE

CROSS-REFERENCE TO RELATED APPLICATIONS

This application is a continuation of co-pending U.S. patent application Ser. No. 12/906,144, filed Oct. 18, 2010, and titled "Dynamic Rerouting of Service Requests Between Service Endpoints for Web Services in a Composite Service," the entire contents of which are hereby incorporated by reference herein.

BACKGROUND

Conventional software applications have generally been installed and executed in a localized computing environment, such as a desktop or enterprise environment. The advancement of increasingly powerful computing devices and expanding data storage capacity in large scale networked data centers has moved consumer and business-oriented applications away from local computing environments to computing environments provided over the Internet or other types of networks, commonly referred to as "cloud-based" computing environments. These applications may be offered as hosted services in the cloud-based computing environment.

As the Internet continues to grow, service providers may continue to offer more diverse hosted services. These hosted services may be offered at various levels, including end user services and various backend services. For example, a hosted service may offer one level of service to one hosted service and offer another level of service to another hosted service. The various levels of service may refer to different allocations of resources, such as processing resources, memory resources, networking resources, and/or the like. Combining these hosted services can yield a composite service. It is difficult, however, to integrate multiple levels of hosted services, especially when these hosted services are offered by different service providers.

It is with respect to these considerations and others that the disclosure made herein is presented.

SUMMARY

Technologies are described herein for dynamically rerouting service requests between service endpoints for web services in a composite service. A composite service may include multiple World Wide Web ("web") services, such as a first web service and a second web service. The first web service may consume the second web service in that the first web service may utilize first results provided by the second web service. In order to receive the first results provided by the second web service, the first web service may subscribe to the second web service. The second web service may offer various levels of service, each of which may correspond to a different service level agreement ("SLA") type. When the first web service subscribes to the second web service, the first web service may be associated with a SLA type defining a level of service that the first web service receives from the second web service.

The second web service may be associated with various service endpoints configured to respond to service requests from the first web service. For example, these service endpoints may include server computers adapted to respond to the service requests. Other service endpoints may include any suitable hardware and/or software entities capable of being allocated for responding to the service requests. Some service endpoints may be controlled by the second web service, while other service endpoints may be controlled by other web services.

Through the utilization of the technologies and concepts presented herein, when the second web service receives a service request from the first web service, the second web service may assign the service request to an initial service endpoint that can satisfy minimum performance thresholds defined by the SLA type. The second web service may monitor the service endpoint according to various service criteria, such as server load, service outages, and/or response times. If the second web service determines that the service criteria do not meet the minimum performance thresholds defined by the SLA type, then the second web service may reroute the service request to an alternate service endpoint that can satisfy the minimum performance thresholds defined by the SLA type. The second web service may continue to monitor service criteria of the currently operating service endpoint and dynamically reroute the service request to other service endpoints as necessary in order to minimize cost and maximize efficiency.

Example technologies may provide for rerouting a service request between service endpoints. The technologies receive, at a first web service, the service request from a second web service. A composite service may include the first web service and the second web service. The technologies route the service request to an initial service endpoint configured to respond to the service request according to a service level agreement between the first web service and the second web service. The technologies determine whether the service criteria meet a performance threshold specified by the service level agreement. If a determination is made that the service criteria do not meet the performance threshold specified by the service level agreement, then the technologies reroute the service request from the initial service endpoint to an alternate service endpoint.

It should be appreciated that the above-described subject matter may also be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
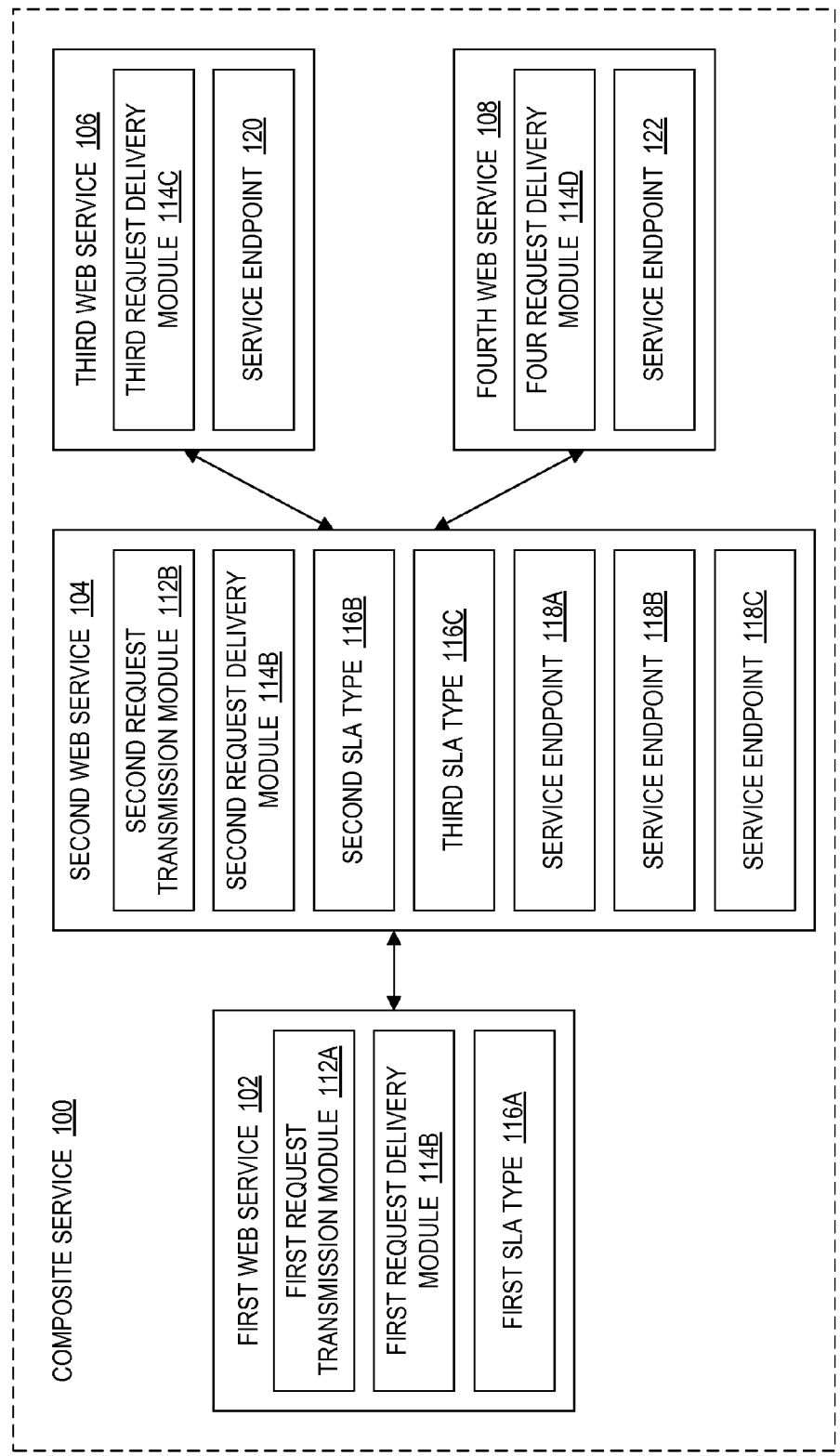
FIG. 1 is a block diagram illustrating a composite service adapted to reroute a service request between service endpoints for web services in a composite service, in accordance with some embodiments.

The following detailed description is directed to technologies for dynamically rerouting a service request between service endpoints for web services in a composite service. In accordance with some embodiments described herein, a composite service may include multiple web services. Each of these web services may include one or more service endpoints adapted to respond to service requests from other web services in the composite service. When a web service receives a service request, the web service may assign an initial service endpoint that can respond to the service request in accordance with relevant SLA requirements. The web service may then monitor the performance of the initial service endpoint according to various service criteria to determine whether the SLA requirements are met. If the web service determines that the service criteria do not meet the SLA requirements, then the web service may dynamically reroute the service request to an alternate service endpoint that can respond to the service request in accordance with the SLA requirements.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration, specific embodiments, or examples. Referring now to the drawings, in which like numerals represent like elements through the several figures, a computing system and methodology for dynamically remapping service endpoints for web services in a composite service will be described.

FIG. 1 illustrates a composite service 100 adapted to dynamically reroute a service request between service endpoints for web services in a composite service, in accordance with some embodiments. The composite service 100 may include a first web service 102, a second web service 104, a third web service 106, and a fourth web service 108. The web services 102-108 may be coupled via a communications network, such as the network 318 illustrated in FIG. 3. An example of the composite service 100 is the monitoring service described in U.S. patent application Ser. No. 12/900, 481, filed Oct. 8, 2010, entitled "Providing a Monitoring Service in a Cloud-Based Computing Environment," which is hereby incorporated by reference in its entirety. Some examples of the web services 102-108 include the various web services (e.g., controller application, monitor application, finder application, analyzer application, notifier application, etc.) also described in the above referenced and incorporated patent application entitled "Providing a Monitoring Service in a Cloud-Based Environment."

The first web service 102 may include a first request transmission module 112A, a first request delivery module 114A, and a first SLA type 116A. The second web service 104 may include a second request transmission module 112B, a second request delivery module 114B, a second SLA type 116B, and a third SLA type 116C. The third web service 106 may include a third request delivery module 114C. The fourth web service 108 may include a fourth request delivery module 114D. The request transmission modules 112A-112B may be collectively referred to as request transmission modules 112. The request delivery modules 114A-114D may be collectively referred to as request delivery modules 114. The SLA types 116A-116C may be collectively referred to as SLA types 116.

In the example illustrated in FIG. 1, the first web service 102 may be subscribed to the second web service 104. The first SLA type 116A may correspond to a level of service that the second web service 104 provides to the first web service 102. Further, the second web service 104 may be subscribed to the third web service 106. The second SLA type 116B may correspond to a level of service that the third web service 106 provides to the second web service 104. Additionally, the second web service 104 may be subscribed to the fourth web service 108. The third SLA type 116C may correspond to a level of service that the fourth web service 108 provides to the second web service 104. One or more of the web services 102-108 may be operated by different entities.

The SLA types 116 may be associated with different fees paid by operators of the respective web services 102-104. For example, operators may pay higher fees for SLA types yielding a higher level of service, and pay lower fees for SLA types yielding a lower level of service. A higher level of service may correspond to a greater allocation of resources, while a lower level of service may correspond to a lesser allocation of resources. Such resources may include hardware, software, and/or networking resources provided by the web services 104-108.

The second web service 104 may further include one or more service endpoints, such as service endpoints 118A-118C. The service endpoints 118A-118C may be collectively referred to as service endpoints 118. The third web service 106 may further include one or more service endpoints, such as a service endpoint 120. The fourth web service 108 may further include one or more service endpoints, such as a service endpoint 122. In some embodiments, the service endpoints 118, 120, 122 may refer to server computers adapted to respond to service requests. In other embodiments, the service endpoints 118, 120, 122 may refer to other suitable hardware and/or software entities that can be allocated to respond to service requests.

According to various embodiments, a request transmission module may be configured to transmit a service request from a requester web service to a provider web service. A service request may refer to any suitable request for information that can be provided by the provider web service. In one example, if the provider web service is a product finder service, then the service request may be a request for product pricing and availability for a given product query. The product finder service may then retrieve the corresponding product pricing and availability information for the requester web service. In another example, if the provider web service is a notifier service, then the service request may be a request to notify a user of an event. The notifier service may then notify the user of the event and provide acknowledgement of the notification to the requester web service.

Also according to various embodiments, a request delivery module may be configured to receive the service request and to route the service request to an initial service endpoint that can respond to the service request according to the relevant SLA type. The request delivery module may then monitor service criteria of the service endpoint while the service endpoint responds to the service request. Some examples of the service criteria may include server load, service outages, and/or response times. If the service criteria do not meet the requirements of the SLA type, then the request delivery module may reroute the service request to an alternate service endpoint that can respond to the service request according to the SLA type. The request delivery module may be configured to continue to monitor the service criteria of the alternate service endpoint and dynamically reroute the service request between service endpoints as necessary in order to minimize cost and maximize efficiency.

In an illustrative example, the first web service 102 may send a service request to the second web service 104. That is, the first request transmission module 112A may send the service request to the second request delivery module 114B. The service request may include relevant identifying information, such as a unique identifier, specifying the first SLA type 116A. When the second request delivery module 114B receives the service request, the second request delivery module 114B may route the service request to an initial service endpoint, such as the service endpoint 118A, to respond to the service request. The initial service endpoint may be selected for any suitable reason.

When the second request delivery module 114B initially routes the service request to the service endpoint 118A to respond to the service request, the second request delivery module 114B may monitor service criteria related to the service endpoint 118A. The second request delivery module 114B may then evaluate the service criteria against various performance thresholds associated with the first SLA type 116A. In one example, the first SLA type 116A may specify that the second web service 104 should respond to service requests within a threshold amount of time. In this case, if the service endpoint 118A does not respond to the service requests within the threshold amount of time, then the second request delivery module 114B may reroute the service endpoint to an alternate service endpoint. In another example, the first SLA type 116A may specify that the second web service 104 should have an uptime of at least 99%. In this case, if the service endpoint 118A is down for a significant period of time for scheduled maintenance, then the second request delivery module 114B may reroute the service request to an alternate service endpoint.

If the second request delivery module 114B determines that the service criteria meet minimum performance thresholds specified by the first SLA type 116A, then the second request delivery module 114B may not reroute the service request from the initial service endpoint. However, if the second request delivery module 114B determines that the service criteria do not meet minimum performance thresholds specified by the first SLA type 116A, then the second request delivery module 114B may identify one or more alternate service endpoints. The alternate service endpoints may be any suitable endpoints that are configured to respond to the service request according to the first SLA type 116A. The alternate service endpoints may include service endpoints, such as the service endpoints 118 operated and/or controlled by the second web service 104. The alternate service endpoints may also include service endpoints, such as the service endpoints 120, 122, operated and/or controlled by other web services. Upon identifying the alternate service endpoints, the second request delivery module 114B may select an alternate service endpoint from the alternate service endpoints. The second request delivery module 114B may then reroute the service request from the service endpoint 118A to the selected alternate service endpoint.

According to various embodiments, the preferred service endpoint may be selected by evaluating efficiency of the alternate service endpoints. The efficiency evaluations may include techniques related to evaluating and optimizing utilization of hardware, software, and/or networking resources. In one example, if the service endpoint 118B and the service endpoint 118C are configured to respond to the service request, then the second request delivery module 114B may reroute the service request from the initial service endpoint to the alternate service endpoint having the lowest current server load. In another example, if the service endpoint 118B and the service endpoint 118C are configured to respond to the service request, then the second request delivery module 114B may reroute the service request to the alternate service endpoint anticipated to have the lowest server load based on previous load patterns. An anticipated spike in server traffic at one service endpoint may cause the second request delivery module 114B to reroute the service request to another service endpoint. The current server load and previous load patterns may also be combined to select the appropriate service endpoint such that the service endpoints are load balanced.

The efficiency evaluations may include techniques related to reducing and managing costs. For example, if the service endpoint 120 and the service endpoint 122 are configured to respond to the service request, then the second request delivery module 114B may select the service endpoint charging the lowest cost of operation. The second SLA type 116B associated with the third web service 106 may have different fees and other negotiated rates than the third SLA type 116C associated with the fourth web service 108. As a result, the cost of utilizing the service endpoint 120 may differ from the cost of utilizing the service endpoint 122.

Figure 2:
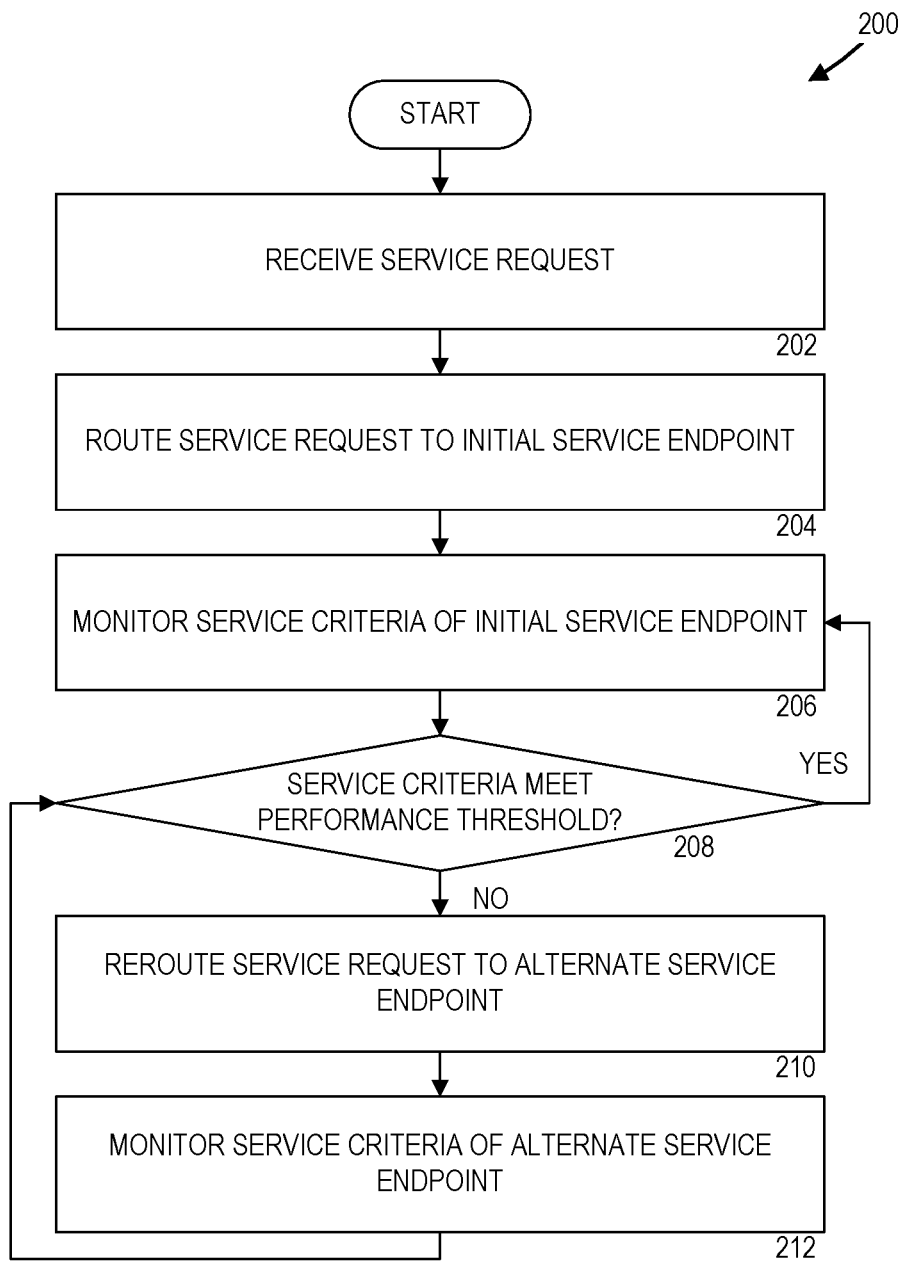
FIG. 2 is a flow diagram illustrating a method for rerouting a service request between service endpoints for web services in a composite service, in accordance with some embodiments.

Referring now to FIG. 2, additional details regarding the operations of the request transmission modules 112 and the request delivery modules 114 will be provided. In particular, FIG. 2 is a flow diagram illustrating a method for dynamically rerouting a service request between service endpoints for web services in a composite service, in accordance with some embodiments. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

In FIG. 2, a routine 200 begins at operation 202, where a request delivery module, such as the second request delivery module 114B, may receive a service request from a request transmission module, such as the first request transmission module 112A. The service request may include identifying information of the first SLA type 116A between the first web service 102 and the second web service 104. The routine 200 then proceeds to operation 204, where the second request delivery module 114B may route the service request to an initial service endpoint, such as the service endpoint 118A, configured to respond to the service request according to the first SLA type 116A. The initial service endpoint may be selected for any suitable reason. When the second request delivery module 114B routes the service request to the service endpoint 118A, the routine 200 proceeds to operation 206.

At operation 206, the second request delivery module 114B may monitor service criteria of the service endpoint 118A. Some example service criteria may include server load, service outages, and/or response times of the service endpoint 118A. The routine 200 then proceeds to operation 208, where the second request delivery module 114B may determining whether the monitored service criteria meet minimum performance thresholds specified by the first SLA type 116A. If a determination is made that the monitored service criteria meet the minimum performance thresholds specified by the first SLA type 116A, then the second request delivery module 114B proceeds back to the operation 206, thereby maintaining the initial service endpoint for handling the service request.

If a determination is made that the monitored service criteria does not meet the minimum performance thresholds specified by the first SLA type 116A, then the second request delivery module 114B proceeds to operation 210. At operation 210, the second request delivery module 114B may reroute the service request to an alternate service endpoint, such as the service endpoints 118B-118C, 120, 122. In some embodiments, the second request delivery module 114B may identify one or more alternate service endpoints. The second request delivery module 114B may then select the alternate service endpoint from the alternate service endpoints based on an efficiency determination. The efficiency determination may be based on an efficient utilization of hardware, software, and/or networking resources. The efficiency determination may also be based on an efficient management of costs. When the second request delivery module 114B selects the alternate service endpoint from the alternate service endpoints, the second request delivery module 114B may reroute the service request to the selected alternate service endpoint. When the second request delivery module 114B reroutes the service request to the selected alternate service endpoint, the routine 200 proceeds to operation 212.

At operation 212, the second request delivery module 114B may continue monitoring the service criteria of the current service endpoint that is assigned to respond to the service request until the service request has been completed. The routine 200 then proceeds back to operation 208, where the second request delivery module 114B dynamically reroutes the service request to other service endpoints as necessary in order to minimize cost and maximize efficiency. The routine 200 may repeat (e.g., periodically, continuously, or on demand as needed) or terminate.

Figure 3:
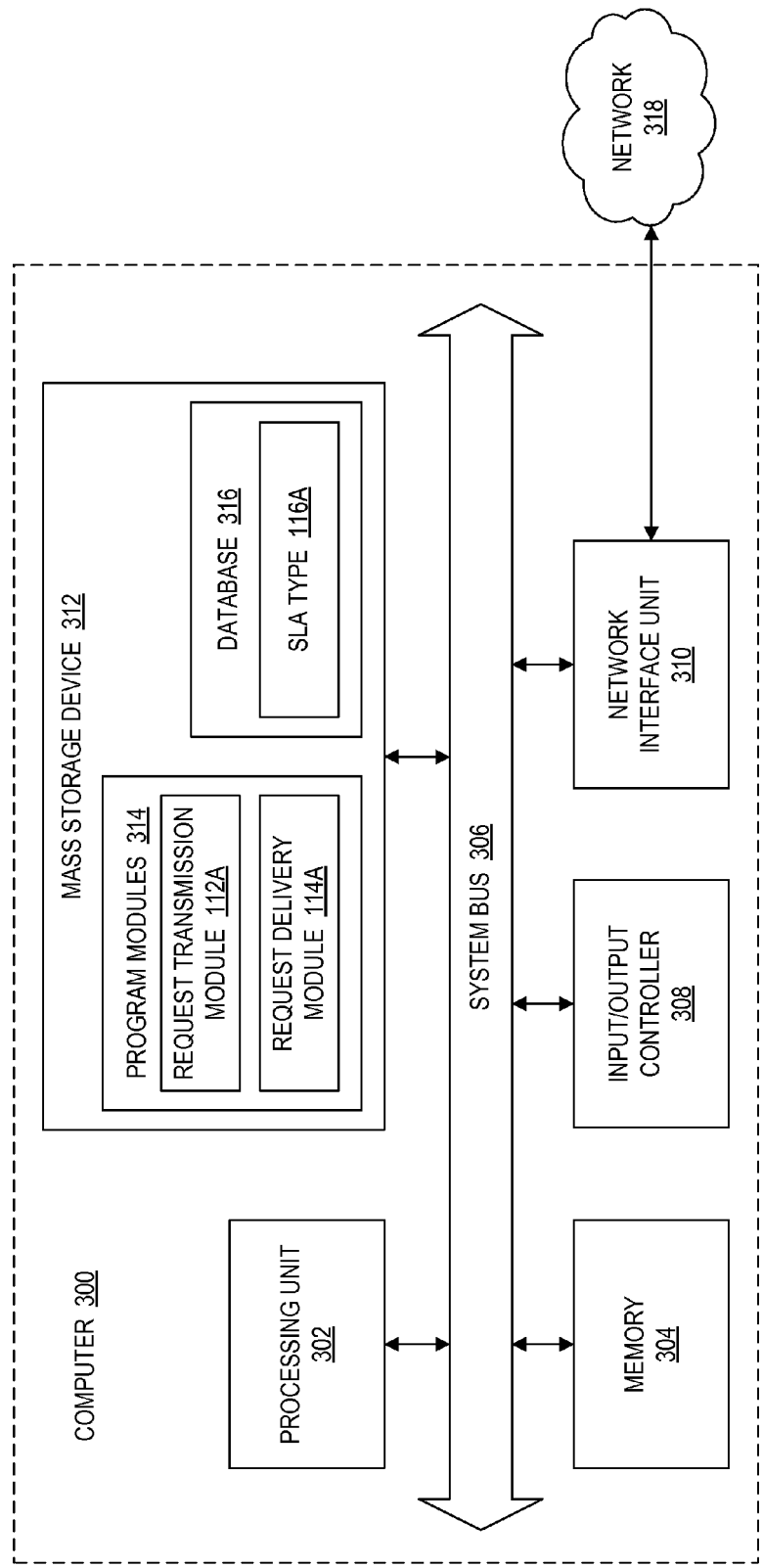
FIG. 3 is a computer architecture diagram showing an illustrative computer hardware architecture for a computing system capable of implementing the embodiments presented herein.

Turning now to FIG. 3, an example computer architecture diagram showing a computer 300 is illustrated. The computer 300 may include a central processing unit 302, a system memory 304, and a system bus 306 that couples the memory 304 to the 302. The computer 300 may further include a mass storage device 312 for storing one or more program modules 314 and the database 316. Examples of the program modules 314 may include the first request transmission module 112A and the first request delivery module 114A. The database 316 may store identifying information for the first SLA type 116A. The mass storage device 312 may be connected to the processing unit 302 through a mass storage controller (not shown) connected to the bus 306. The mass storage device 312 and its associated computer-storage media may provide non-volatile storage for the computer 300. Although the description of computer-storage media contained herein refers to a mass storage device, such as a hard disk or CD-ROM drive, it should be appreciated by those skilled in the art that computer-storage media can be any available computer storage media that can be accessed by the computer 300.

By way of example, and not limitation, computer-storage media may include volatile and non-volatile, removable and non-removable media implemented in any method or technology for the non-transitory storage of information such as computer-storage instructions, data structures, program modules, or other data. For example, computer-storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 300.

According to various embodiments, the computer 300 may operate in a networked environment using logical connections to remote computers through a network such as the network 318. The computer 300 may connect to the network 318 through a network interface unit 310 connected to the bus 306. It should be appreciated that the network interface unit 310 may also be utilized to connect to other types of networks and remote computer systems. The computer 300 may also include an input/output controller 308 for receiving and processing input from a number of input devices (not shown), including a keyboard, a mouse, a microphone, and a game controller. Similarly, the input/output controller 308 may provide output to a display or other type of output device (not shown).

The bus 306 may enable the processing unit 302 to read code and/or data to/from the mass storage device 312 or other computer-storage media. The computer-storage media may represent apparatus in the form of storage elements that are implemented using any suitable technology, including but not limited to semiconductors, magnetic materials, optics, or the like. The computer-storage media may represent memory components, whether characterized as RAM, ROM, flash, or other types of technology. The computer-storage media may also represent secondary storage, whether implemented as hard drives or otherwise. Hard drive implementations may be characterized as solid state, or may include rotating media storing magnetically-encoded information.

The program modules 314 may include software instructions that, when loaded into the processing unit 302 and executed, cause the computer 300 to dynamically reroute a service request between service endpoints for web services in a composite service. The program modules 314 may also provide various tools or techniques by which the computer 300 may participate within the overall systems or operating environments using the components, flows, and data structures discussed throughout this description. For example, the program modules 314 may implement interfaces for dynamically rerouting a service request between service endpoints for web services in a composite service.

In general, the program modules 314 may, when loaded into the processing unit 302 and executed, transform the processing unit 302 and the overall computer 300 from a general-purpose computing system into a special-purpose computing system customized to dynamically reroute a service request between service endpoints for web services in a composite service. The processing unit 302 may be constructed from any number of transistors or other discrete circuit elements, which may individually or collectively assume any number of states. More specifically, the processing unit 302 may operate as a finite-state machine, in response to executable instructions contained within the program modules 314. These computer-executable instructions may transform the processing unit 302 by specifying how the processing unit 302 transitions between states, thereby transforming the transistors or other discrete hardware elements constituting the processing unit 302.

Encoding the program modules 314 may also transform the physical structure of the computer-storage media. The specific transformation of physical structure may depend on various factors, in different implementations of this description. Examples of such factors may include, but are not limited to: the technology used to implement the computer-storage media, whether the computer-storage media are characterized as primary or secondary storage, and the like. For example, if the computer-storage media are implemented as semiconductor-based memory, the program modules 314 may transform the physical state of the semiconductor memory, when the software is encoded therein. For example, the program modules 314 may transform the state of transistors, capacitors, or other discrete circuit elements constituting the semiconductor memory.

As another example, the computer-storage media may be implemented using magnetic or optical technology. In such implementations, the program modules 314 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope of the present description, with the foregoing examples provided only to facilitate this discussion.

Based on the foregoing, it should be appreciated that technologies for dynamically rerouting a service request between service endpoints for web services in a composite service are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for rerouting a service request between service endpoints, the method comprising computer-implemented operations for:
   receiving, at a second web service, the service request from a first web service separate from the second web service, the first web service providing a first service and the second web service consumed by the first service in a composite service;
   routing the service request to an initial service endpoint of the second web service configured to respond to the service request according to a service level agreement between the first web service and the second web service;
   monitoring service criteria associated with the initial service endpoint;
   determining, at the second web service, whether the service criteria associated with the initial service endpoint meet a performance threshold specified by the service level agreement; and
   in response to determining that the service criteria do not meet the performance threshold specified by the service level agreement, rerouting the service request from the initial service endpoint of the second web service to a second service endpoint of the second web service or to an alternate service endpoint of a third web service, separate from the first web service and the second web service, for servicing the service request at the second web service or the third web service.

2. The computer-implemented method of claim 1, wherein the service request comprises a request for information provided by the second web service to the first web service.

3. The computer-implemented method of claim 1, routing the service request to an initial service endpoint configured to respond to the service request according to a service level agreement between the first web service and the second web service comprises routing the service request to a first server computer configured to respond to the service request according to the service level agreement between the first web service and the second web service.

4. The computer-implemented method of claim 3, wherein monitoring the service criteria associated with the initial service endpoint comprises monitoring server load of the first server computer, service outages of the first server computer, or response times of the first server computer.

5. The computer-implemented method of claim 4, wherein determining whether the service criteria meet a performance threshold specified by the service level agreement comprises determining whether the server load, the service outages, or the response times meet the performance threshold specified by the service level agreement.

6. The computer-implemented method of claim 5, wherein in response to determining that the service criteria do not meet the performance threshold specified by the service level agreement, rerouting the service request from the initial service endpoint to an alternate service endpoint comprises in response to determining that the server load, the service outages, or the response times do not meet the performance threshold specified by the service level agreement, rerouting the service request from the first server computer to a second server computer.

7. The computer-implemented method of claim 1, wherein rerouting the service request from the initial service endpoint to an alternate service endpoint comprises:
   identifying a plurality of alternate service endpoints configured to respond to the service request according to the service level agreement between the first web service and the second web service;

selecting the alternate service endpoint from the plurality of alternate service endpoints based on efficiency of the alternate service endpoint; and rerouting the service request from the initial service endpoint to the selected alternated service endpoint.

8. The computer-implemented method of claim 7, wherein selecting the alternate service endpoint from the plurality of alternate service endpoints based on efficiency of the alternate service endpoint comprises selecting the alternate service endpoint having a lowest current server load from the plurality of alternate service endpoints.

9. The computer-implemented method of claim 7, wherein selecting the alternate service endpoint from the plurality of alternate service endpoints based on efficiency of the alternate service endpoint comprises selecting the alternate service endpoint having a lowest anticipated server load based on load patterns.

10. The computer-implemented method of claim 7, wherein selecting the alternate service endpoint from the plurality of alternate service endpoints based on efficiency of the alternate service endpoint comprises selecting the alternate service endpoint having a lowest monetary cost from the plurality of alternate service endpoints.

11. The computer-implemented method of claim 10, wherein the plurality of alternate service endpoints comprises a first alternate service endpoint associated with a third web service in the composite service and a second alternate service endpoint associated with a fourth web service in the composite service;

wherein the first alternate service endpoint is associated with a higher fee between the second web service and the third web service and the second alternate service endpoint is associated with a lower fee between the second web service and the fourth web service; and wherein selecting the alternate service endpoint having a lowest monetary cost from the plurality of alternate service endpoints comprises selecting the second alternate service endpoint associated with the lower fee from the plurality of alternate service endpoints.

12. A computer system, comprising:

a processor;

a memory communicatively coupled to the processor; and a program module that, when executed by the processor, causes the computer system to reroute a service request between service endpoints by:

receiving, at a second web service, the service request from a first web service separate from the second web service, the first web service providing a first service and the second web service consumed by the first service in a composite service;

routing the service request to an initial service endpoint of the second web service configured to respond to the service request according to a service level agreement between the first web service and the second web service;

monitoring service criteria associated with the initial service endpoint;

determining, at the second web service, whether the service criteria meet a performance threshold specified by the service level agreement; and in response to determining that the service criteria do not meet the performance threshold specified by the service level agreement, identifying, at the second web service, a plurality of alternate service endpoints configured to respond to the service request according to the service level agreement and a monetary cost of utilizing each of the plurality of alternative service endpoints.

13. The computer system of claim 12, wherein the program module further causes the causes the computer system to reroute a service request between service endpoints by:

selecting an alternate service endpoint from the plurality of alternate service endpoints based on efficiency of the alternate service endpoint comprises selecting the alternate service endpoint having a lowest current server load from the plurality of alternate service endpoints; and rerouting the service request from the initial service endpoint to the selected alternate service endpoint.

14. The computer system of claim 13, wherein selecting an alternate service endpoint from the plurality of alternate service endpoints based on efficiency of the alternate service endpoint further comprises selecting the alternate service endpoint having a lowest anticipated server load based on load patterns.

15. The computer system of claim 13, wherein selecting the alternate service endpoint from the plurality of alternate service endpoints based on efficiency of the alternate service endpoint further comprises selecting the alternate service endpoint having a lowest monetary cost from the plurality of alternate service endpoints.

16. The computer system of claim 15, wherein the plurality of alternate service endpoints comprises a first alternate service endpoint associated with a third web service in the composite service and a second alternate service endpoint associated with a fourth web service in the composite service;

wherein the first alternate service endpoint is associated with a higher fee between the second web service and the third web service and the second alternate service endpoint is associated with a lower fee between the second web service and the fourth web service; and wherein selecting the alternate service endpoint having a lowest monetary cost from the plurality of alternate service endpoints comprises selecting the second alternate service endpoint associated with the lower fee from the plurality of alternate service endpoints.

17. The computer system of claim 13, wherein rerouting the service request to an initial service endpoint configured to respond to the service request according to a service level agreement between the first web service and the second web service comprises routing the service request to a first server computer configured to respond to the service request according to the service level agreement between the first web service and the second web service.

18. The computer system of claim 17, wherein monitoring the service criteria associated with the initial service endpoint comprises monitoring server load of the first server computer, service outages of the first server computer, or response times of the first server computer; and wherein determining whether the service criteria meet a performance threshold specified by the service level agreement comprises determining whether the server load, the service outages, or the response times meet the performance threshold specified by the service level agreement.

19. The computer system of claim 18, wherein in response to determining that the service criteria do not meet the performance threshold specified by the service level agreement, rerouting the service request from the initial service endpoint to an alternate service endpoint comprises in response to determining that the server load, the service outages, or the response times do not meet the performance threshold specified by the service level agreement, rerouting the service request from the first server computer to a second server computer.

20. A computer storage device having computer-executable instructions stored thereon which, when executed by a computer, cause the computer to:
receive, at a second web service, a service request from a first web service, the first web service separate from the second web service, the first web service providing a first service and the second web service consumed by the first service-in a composite service;
route the service request to an initial server computer of the second web service configured to respond to the service request according to a service level agreement between the first web service and the second web service;
monitor server load of the initial server computer, service outages of the initial server computer, or response times of the initial server computer;
determine whether the server load, the service outages, or the response times meet a performance threshold specified by the service level agreement;
in response to determining that the server load, the service outages, or the response times do not meet the performance threshold specified by the service level agreement, identify a plurality of alternate server computers of the second web service or a third web service configured to respond to the service request according to the service level agreement;
select an alternate server computer from the plurality of alternate server computers based on efficiency of the alternate server computer and monetary cost; and
reroute the service request from the initial server computer to the selected alternate server computer.

21. A computer-implemented method for rerouting a service request between service endpoints, the method comprising computer-implemented operations for:
receiving, at a computer associated with a second web service, the service request from another computer separate from the second web service, the other computer providing a first service and the computer associated with the second web service providing a second service consumed by the first service in a composite service;
routing the service request to an initial service endpoint of the second web service configured to respond to the service request according to a service level agreement between the other computer and the second web service;
monitoring service criteria associated with the initial service endpoint;
determining, at the second web service, whether the service criteria associated with the initial service endpoint meet a performance threshold specified by the service level agreement; and
in response to determining that the service criteria do not meet the performance threshold specified by the service level agreement, rerouting the service request from the initial service endpoint of the second web service to a second service endpoint of the second web service or to an alternate service endpoint of a third web service, separate from the first web service and the second web service, for servicing the service request at the second web service or the third web service.

22. The computer-implemented method of claim 21, wherein the service request comprises a request for information provided by the second web service to the other computer.

23. The computer-implemented method of claim 21, routing the service request to an initial service endpoint configured to respond to the service request according to a service level agreement between the other computer and the second web service comprises routing the service request to a first server computer configured to respond to the service request according to the service level agreement between the other computer and the second web service.

24. The computer-implemented method of claim 23, wherein monitoring the service criteria associated with the initial service endpoint comprises monitoring server load of the first server computer, service outages of the first server computer, or response times of the first server computer.

25. The computer-implemented method of claim 24, wherein determining whether the service criteria meet a performance threshold specified by the service level agreement comprises determining whether the server load, the service outages, or the response times meet the performance threshold specified by the service level agreement.

26. The computer-implemented method of claim 25, wherein in response to determining that the service criteria do not meet the performance threshold specified by the service level agreement, rerouting the service request from the initial service endpoint to an alternate service endpoint comprises in response to determining that the server load, the service outages, or the response times do not meet the performance threshold specified by the service level agreement, rerouting the service request from the first server computer to a second server computer.

27. The computer-implemented method of claim 21, wherein rerouting the service request from the initial service endpoint to an alternate service endpoint comprises:
identifying a plurality of alternate service endpoints configured to respond to the service request according to the service level agreement between the other computer and the second web service;
selecting the alternate service endpoint from the plurality of alternate service endpoints based on efficiency of the alternate service endpoint; and
rerouting the service request from the initial service endpoint to the selected alternated service endpoint.

28. The computer-implemented method of claim 27, wherein selecting the alternate service endpoint from the plurality of alternate service endpoints based on efficiency of the alternate service endpoint comprises selecting the alternate service endpoint having a lowest current server load from the plurality of alternate service endpoints.

29. The computer-implemented method of claim 27, wherein selecting the alternate service endpoint from the plurality of alternate service endpoints based on efficiency of the alternate service endpoint comprises selecting the alternate service endpoint having a lowest anticipated server load based on load patterns.

30. The computer-implemented method of claim 27, wherein selecting the alternate service endpoint from the plurality of alternate service endpoints based on efficiency of the alternate service endpoint comprises selecting the alternate service endpoint having a lowest monetary cost from the plurality of alternate service endpoints.

31. The computer-implemented method of claim 30, wherein the plurality of alternate service endpoints comprises a first alternate service endpoint associated with a third web service in the composite service and a second alternate service endpoint associated with a fourth web service in the composite service;
  wherein the first alternate service endpoint is associated with a higher fee between the second web service and the third web service and the second alternate service endpoint is associated with a lower fee between the second web service and the fourth web service; and
  wherein selecting the alternate service endpoint having a lowest monetary cost from the plurality of alternate service endpoints comprises selecting the second alternate service endpoint associated with the lower fee from the plurality of alternate service endpoints.

\* \* \* \* \*